United States Patent
Beauchesne et al.

(10) Patent No.: US 9,900,336 B2
(45) Date of Patent: Feb. 20, 2018

(54) SYSTEM FOR DETECTING THREATS USING SCENARIO-BASED TRACKING OF INTERNAL AND EXTERNAL NETWORK TRAFFIC

(71) Applicant: Vectra Networks, Inc., San Jose, CA (US)

(72) Inventors: Nicolas Beauchesne, Miami Beach, FL (US); David Lopes Pegna, San Carlos, CA (US)

(73) Assignee: Vectra Networks, Inc., San Jose, CA (US)

( * ) Notice: Subject to any disclaimer, the term of this patent is extended or adjusted under 35 U.S.C. 154(b) by 1 day.

(21) Appl. No.: 14/930,618

(22) Filed: Nov. 2, 2015

(65) Prior Publication Data

US 2016/0191563 A1    Jun. 30, 2016

Related U.S. Application Data

(60) Provisional application No. 62/074,568, filed on Nov. 3, 2014.

(51) Int. Cl.
*H04L 29/06* (2006.01)
*G06F 21/55* (2013.01)

(52) U.S. Cl.
CPC ........ *H04L 63/1433* (2013.01); *G06F 21/554* (2013.01); *H04L 63/1425* (2013.01)

(58) Field of Classification Search
CPC ............. H04L 63/1425; H04L 63/1433; H04L 63/1416; G06F 21/552; G06F 21/554

USPC ......................................................... 726/25
See application file for complete search history.

(56) References Cited

U.S. PATENT DOCUMENTS

| | | | |
|---|---|---|---|
| 8,578,493 B1 | 11/2013 | Cowan et al. | |
| 2009/0172815 A1* | 7/2009 | Gu | G06F 21/552 726/23 |
| 2011/0225650 A1 | 9/2011 | Margolies et al. | |
| 2013/0019309 A1 | 1/2013 | Strayer et al. | |
| 2013/0291087 A1 | 10/2013 | Kailash et al. | |
| 2014/0208426 A1 | 7/2014 | Natarajan et al. | |
| 2014/0344935 A1* | 11/2014 | Duan | H04L 63/1416 726/24 |
| 2015/0101053 A1* | 4/2015 | Sipple | H04L 63/1425 726/24 |

OTHER PUBLICATIONS

Supplementary European Search Report dated Jul. 26, 2017 for EP Appln. No. 15857216.4.
International Search Report & Written Opinion dated Feb. 5, 2016 for PCT Appln. No. PCT/US15/58680.

* cited by examiner

*Primary Examiner* — Yogesh Paliwal
(74) *Attorney, Agent, or Firm* — Vist IP Law Group, LLP

(57) ABSTRACT

Disclosed is an improved approach to implement a system and method for detecting insider threats, where models are constructed that is capable of defining what constitutes the normal behavior for any given hosts and quickly find anomalous behaviors that could constitute a potential threat to an organization. The disclosed approach provides a way to identify abnormal data transfers within and external to an organization without the need for individual monitoring software on each host, by leveraging metadata that describe the data exchange patterns observed in the network.

33 Claims, 6 Drawing Sheets

SYSTEM FOR DETECTING THREATS USING SCENARIO-BASED TRACKING OF INTERNAL AND EXTERNAL NETWORK TRAFFIC

CROSS-REFERENCE TO RELATED APPLICATION(S)

The present application claims the benefit of U.S. Provisional Application Ser. No. 62/074,568, filed on Nov. 3, 2014, titled "A SYSTEM FOR DETECTING THREATS USING SCENARIO-BASED TRACKING OF INTERNAL AND EXTERNAL NETWORK TRAFFIC", the content of the aforementioned application is hereby incorporated by reference in its entirety.

BACKGROUND

In recent years, it has become increasingly difficult to detect malicious activity carried on internal networks. One type of threat that has become more of an issue in recent times is the "insider" threat. This type of threat pertains to the situation when an insider (such as a company employee or contractor) performs malicious activities from within the company firewall. This is in contrast to many types of other threats that involve attacks from external hosts originating from outside the company network.

An increasing number of recent insider threat cases have now been reported that involve the inappropriate access and ultimate exfiltration of personally identifiable information (PII) and intellectual property. Given the extreme levels of damage that may result from malicious activities of an insider, identification of insider threat has become an important goal in the context of network security for many organizations.

It is typically very difficult to effectively detect the presence of an insider threat. By definition, perimeter solutions (firewalls or Intrusion Prevention Systems) are not deployed in a manner that allows them to detect human-driven malicious behaviors from inside the network—such systems are typically oriented to the detection of outsider threats.

A large array of sensors installed on each individual hosts is one approach that can be taken to monitor and flag malicious behavior. However, such solutions would be too invasive and require very high costs and dedicated tools to analyze the data that would be generated.

In addition, the malicious pattern involved in such cases can be highly sophisticated, involving massive data access and download in a short period of time, or regular, low volume access and download of data over long periods of time. Furthermore, most IT organizations grant hosts inside their networks a very broad set of rights. The definition and detection of anomalous and ultimately malicious behavior is thus much harder. In addition, the volume of traffic moving through modern networks is substantially larger than in the recent past, making it more difficult to assess whether any particular portion of the data conveyed is malicious, harmful, or corresponds to a security breach or threat.

Therefore, there is a need for an improved approach to implement insider threat detections.

SUMMARY

Embodiments of the invention provide an improved approach to implement a system and method for detecting insider threats, where models are constructed that are capable of defining what constitutes the normal behavior for any given hosts and quickly find anomalous behaviors that could constitute a potential threat to an organization.

The disclosed invention provides a way to identify abnormal data transfers within an organization and from inside the organization to the outside without the need for individual monitoring software on each host, by leveraging metadata that describe the data exchange patterns observed in the network. The abnormal data transfers can be part of a data exfiltration scenario that needs to be detected and prevented.

Other additional objects, features, and advantages of the invention are described in the detailed description, figures, and claims.

DETAILED DESCRIPTION

Embodiments of this invention provide an improved approach to implement detection of insider threats. The disclosed invention provides a way to identify abnormal data transfers within an organization without the need for individual monitoring software on each host, by leveraging metadata that describe the data exchange patterns observed in the network.

Being able to identify abnormal data exchanges is extremely important in the field of network security. The potential damage to an organization from exfiltration of intellectual property, in the form of proprietary software or personally identifiable information, represents an increasing concern. In order to identify anomalous data exchanges, it is necessary to characterize the normal data access and consumption for any given host in the network, without the need for individual host sensor software that would explicitly track all the communications and data exchanges for that host.

The disclosed invention proposes a method based on the identification of abnormal data exchange patterns using metadata that simply describes all communication sessions inside a network.

Figure 1:
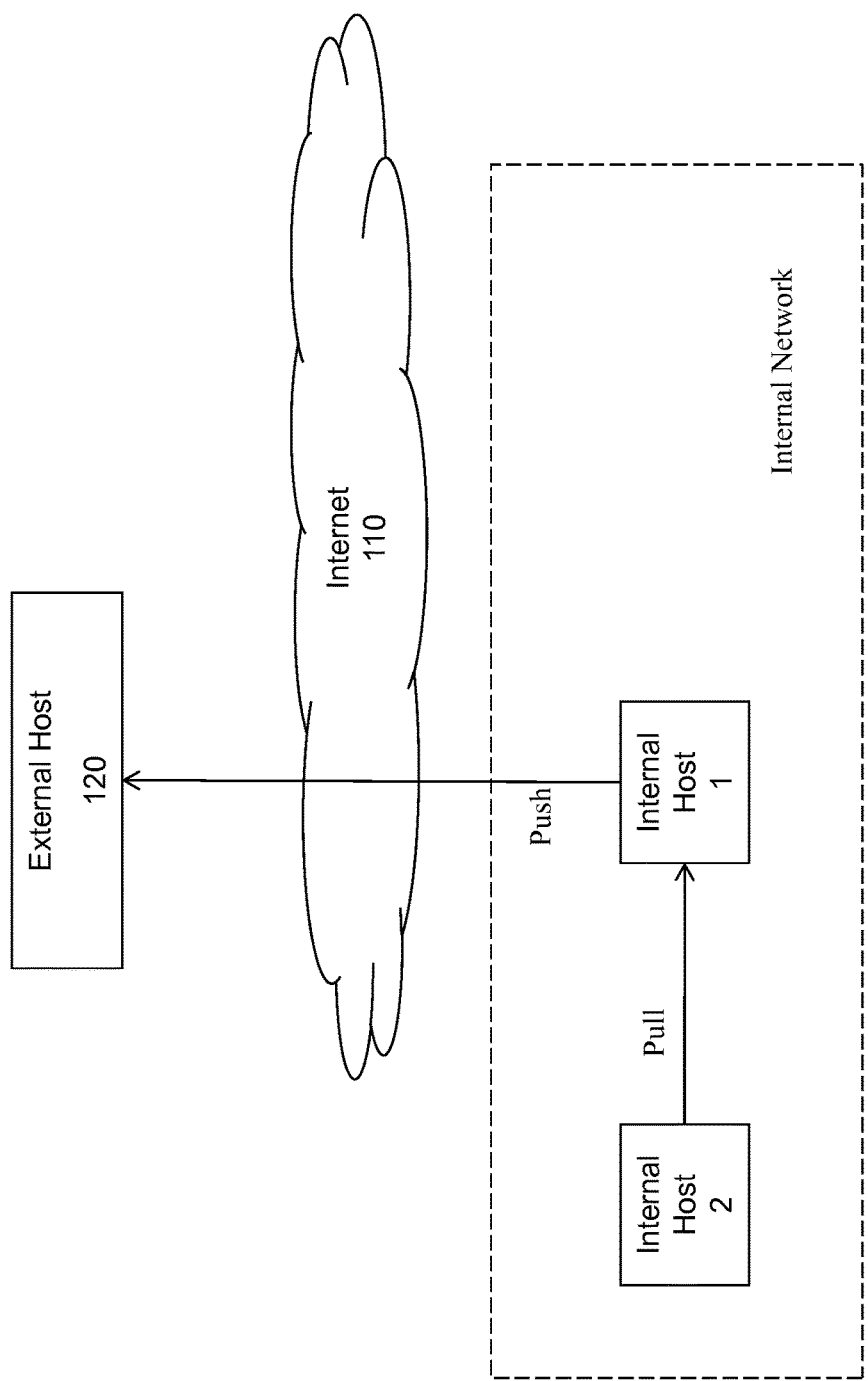
FIG. 1 illustrates two phases that are performed for detecting insider threats.

As illustrated in FIG. 1, some embodiments of the invention pertain to detection of insider threat scenarios involving the exfiltration of confidential or sensitive information by an insider from within an organization. This scenario often involves the malicious insider operating at an internal host (Internal Host 1) within an internal company network. The host may comprise any type of computing apparatus, such as a computer, mobile device or tablet. The malicious insider at Host 1 may retrieve a set of data from one or more other internal hosts (Internal Host 2). For example, the malicious insider at Host 1, may seek to retrieve a substantial amount of information from Host 2, such as financial information from one or more finance servers, technical trade secrets from engineering servers, emails from a mail server, source code from a software code server, and the like. The scenario continues such that the malicious insider at Host 1 will then send the confidential/sensitive information to an external host 120 that is outside of the company network, through one or more networks such as Internet 110.

Embodiments of the invention can be used to detect this type of threat with a process/mechanism having two phases. A first phase is operated to identify significant data exchanges in the form of downloading ('pulling') data from internal sources and then uploading ('pushing') to outside locations, that can be correlated in a given time window. In the second phase, characterization of the baseline behavior is performed for each host in terms of data exchanges with internal or external sources to perform identification of abnormal data pulling or pushing patterns.

Figure 2:
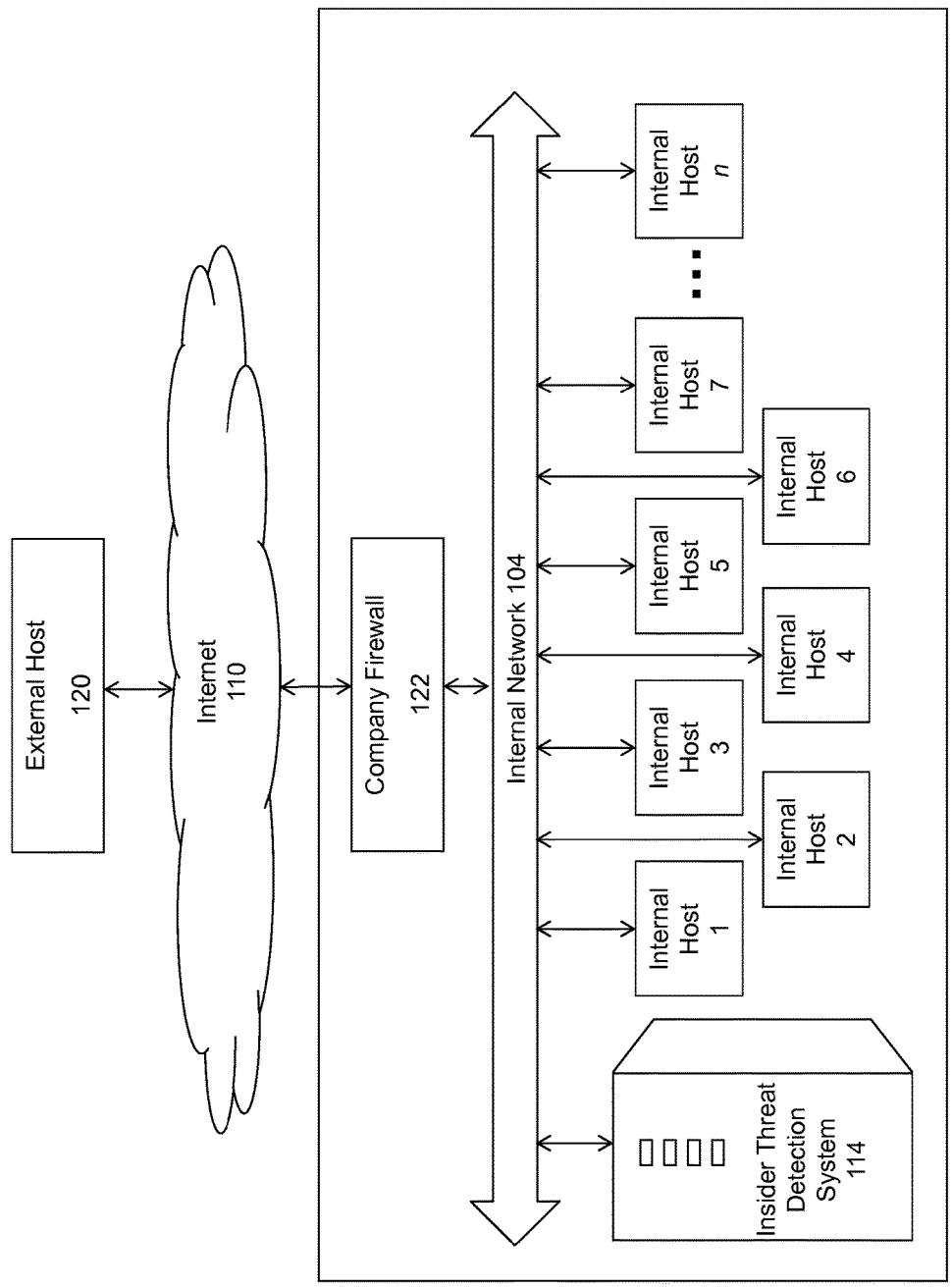
FIG. 2 illustrates how some embodiments of the invention may be implemented.

FIG. 2 illustrates how some embodiments of the invention may be implemented in many organizational networks (also referred to herein without limitation as "company networks"). The internal network infrastructure 104 carries data and communications between multiple points within the company network, including internal traffic between and among internal multiple internal hosts, such as internal hosts 1, . . . ,n. The company network may cover multiple physical locations or may be limited to a single place like a campus network or a data center. This internal traffic usually sits behind a firewall 122, so that any external traffic is carried through the firewall 122 to the public Internet 110 to communicate with any external host 120.

An insider threat detection system 114 is provided to monitor the company network for insider threats. The detection system 114 extracts and maintains metadata across time windows to identify abnormal data exchange patterns using metadata that describes communication sessions inside the network 104.

To operate, the insider threat detection system 114 receives network packets from the internal network infrastructure 104. The insider threat detection system 114 can be implemented as software that resides upon networking equipment within the network 104, such as a router or switch. The insider threat detection system 114 can also be implemented as a dedicated hardware device or can be implemented as software that the company places on hardware of its own choosing either of which monitors network traffic on the network 104.

The insider threat detection system 114 receives packets that are sent within the network, and processes them through a detection algorithm in order to identify and isolate potentially malicious behavior. Network packets arrive at the system 114 from, for example, a SPAN (Switched Port ANalyzer) port or a TAP (Test Access Point) port. The system passively accepts traffic from one or more such ports and processes the traffic using a flow engine. The flow engine organizes the received packets into unidirectional flows of traffic from a single source to a single destination, though the destination may be a multicast or broadcast address, thus potentially arriving at multiple recipients. In an IP network (which this system is illustratively though not exclusively concerned with), a flow is minimally identified by at least a source address and destination address. Some protocols (e.g., UDP and TCP) further support the concept of a source port and a destination port, thus leading to the common use of a five tuple that includes this information (protocol, source port and destination port) to identify a flow.

The insider threat detection system 114 may include a processing engine to process the incoming packets, and to check the network traffic for anomalies worth reporting. A detection algorithm (described in more detail further below) is used to perform these checks. Further details of an example approach that can be taken to implement a processing engine is described in U.S. Non-Provisional application Ser. No. 14/643,931, titled "A SYSTEM AND METHOD FOR DETECTING INTRUSIONS THROUGH REAL-TIME PROCESSING OF TRAFFIC WITH EXTENSIVE HISTORICAL PERSPECTIVE", filed on Mar. 10, 2015, which is hereby incorporated by reference in its entirety.

The disclosed invention proposes a method based at least in part on the identification of abnormal data exchange patterns using metadata that simply describes all communication sessions inside a network. In some embodiments, the threat detection system 114 operates by extracting and maintaining metadata across time windows to enable the identification of abnormal pull and push of data and characterize the baseline pull and push behavior for each host. The system then correlates abnormal push and pull combinations that happen in a short time window or compares in near-real-time each host's pull and push activity with the baseline model for that particular host. The system identifies data pushes that strongly correlate with pull exchanges or represent significant deviation in a host's behavior. These data exchanges are flagged and reported as potential threats.

Detected threats can be stored into a threat database. The threat database includes the information about detections of potentially malicious behavior as well as information about the hosts to which those behaviors are attributed. In some embodiments, the captured information may pertain to specific users who are the origin of the malicious behavior, if a correlation can be made between individuals/users and the hosts.

Figure 3:
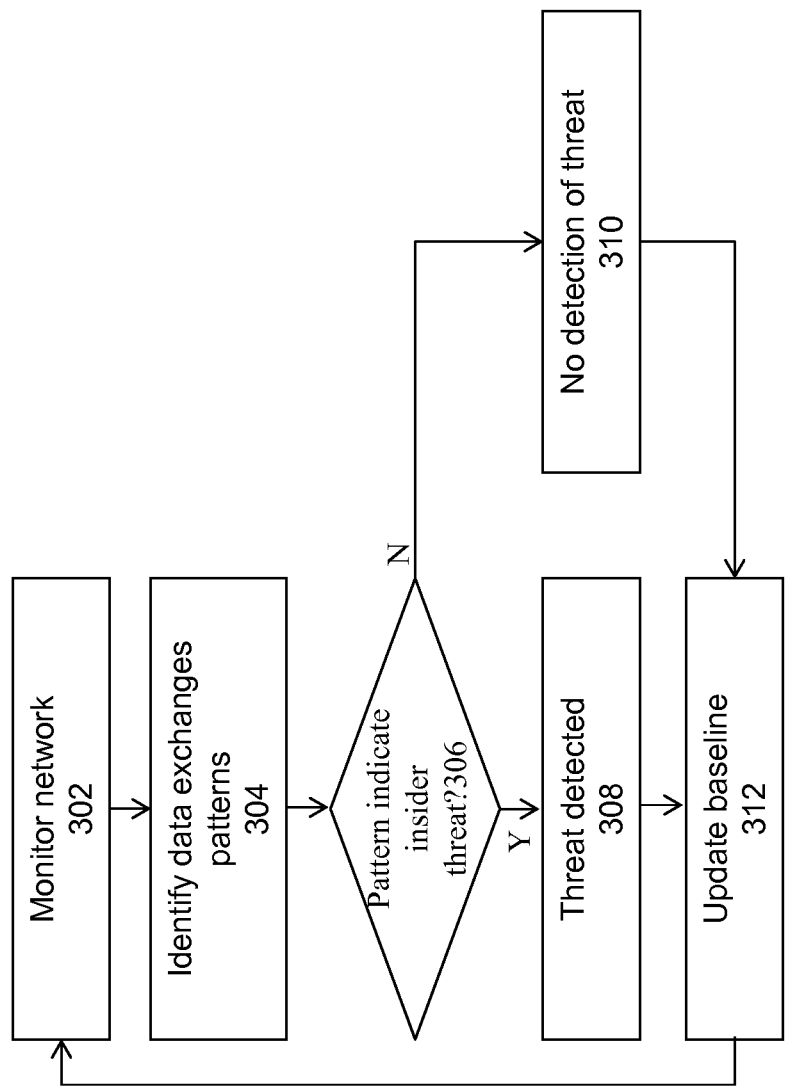
FIG. 3 shows a high level flowchart of an approach to perform insider threat detection according to some embodiments of the invention.

FIG. 3 shows a high level flowchart of an approach to perform insider threat detection according to some embodiments of the invention. At 302, the company network is monitored for network traffic.

At 304, the captured network traffic is analyzed to identify data exchange patterns for hosts within the network. The general idea is that certain patterns of behavior pertinent to an insider threat can be discovered by monitoring network traffic.

For example, one common scenario involving a suspicious pattern of behavior is when an internal host retrieves a significant amount of data from a server from within the company, and then within a short period of time sends a similar amount of data to a location outside of the company network. This type of behavior is a possible indication that an insider threat has occurred where sensitive or confidential information is taken from a company server, and is then leaked or transferred to others outside of the company.

The key is that the system uses learning algorithms to identify baseline levels of behavior for hosts within the network over a given time period, and then performs analysis against the network traffic to check for malicious behavior. This permits the system to correlate the hosts to possibly malicious behavior in a dynamic manner, without requiring excessive levels of monitors on each host.

A determination is therefore made at 306 whether an insider threat has been detected based upon analysis of the behavior patterns. If the analyzed behavior is indicative of an insider threat, then the threat is reported at 308. However, if the analyzed behavior does not correlate to an insider threat, then at 310 the situation does not result in detection of an insider threat. At 312, the analyzed behavior in this case is used to dynamically modify the learned baseline behavior for the host.

Any threats that are detected are placed into a threat database. In addition, an alert can be provided to appropriate personnel (e.g., system administrators) regarding the threat.

Figure 4:
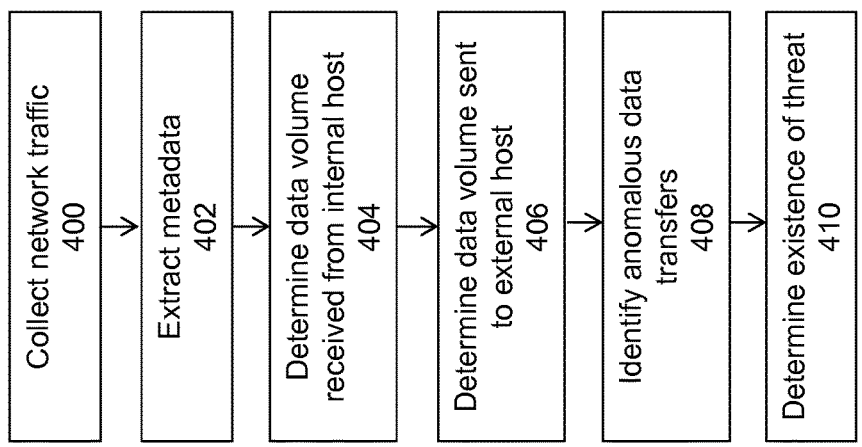
FIG. 4 shows a more detailed flowchart of an approach to perform threat detection according to some embodiments of the invention.

FIG. 4 shows a more detailed flowchart of an approach to perform threat detection according to some embodiments of the invention. At 400, network traffic is collected to construct the model. The collected network traffic includes communications between both internal hosts, as well as communications between internal hosts and external hosts.

At 402, metadata is extracted from the collected traffic. Each communication session within an organization's internal network results in the creation of a set of metadata that contains information including, but not limited to, source and destination host, protocol, destination port (if applicable for the protocol), number of communication attempts, size of data exchanged, duration and time of the communication.

The metadata is maintained across time window(s). This enables the identification of baseline data access behavior for each host, as well as identification of abnormal data pulls and pushes.

At 404, data exchange characteristics are identified for data received by a host from another internal network location. This is performed, for example, by tracking the quantity of data that is received at the internal hosts from other internal hosts. Other measures can also be used to track the data exchange characteristics. For example, such other measures could include data exchange frequency, data exchange rates, data exchange time periods, and special identification of data exchange from assets that are particularly sensitive.

At 406, data exchange characteristics are identified for data sent from the internal hosts to hosts that are external to the company network. This is performed to identify the same data exchange characteristics that were tracked in step 404. For example, the quantity of data is tracked that is sent from the internal hosts to the external hosts. Other measures that can also be used to track the data exchange characteristics include, for example, data exchange frequency, data exchange rates, data exchange time periods, and special identification of data exchange from assets that are particularly sensitive.

At 408, anomalous data transfers are identified for the hosts. This can be performed, for example, by performing analysis in terms of data exchange volume, data exchange frequency, data exchange rate, or pull vs. push data ratio.

The determination of the anomalous data transfers is performed over a given time period. For example, the check of the pull vs. push data ratio can be established over a specific time period, e.g., over a three-hour period, over a one day period, over a one week period, etc.

The system can also establish a baseline behavior for data exchange for each host in terms of pull vs. push data ratio for each resource contacted by the host.

At 410, a determination is made whether the host behavior is identifiable as being indicative of a threat. For example, abnormal data pulls and pushes initiated by the same host that happen in a short time window are correlated with each other and flagged as anomalous. Significant data transfers (pulls or pushes) by a given host and found to be significantly different from the baseline behavior of the hosts are also flagged as anomalous. This could be triggered by an abnormal volume in the data transfer from or to a resource previously contacted by the host or a significant data transfer from or to a resource not previously accessed.

Figure 5:
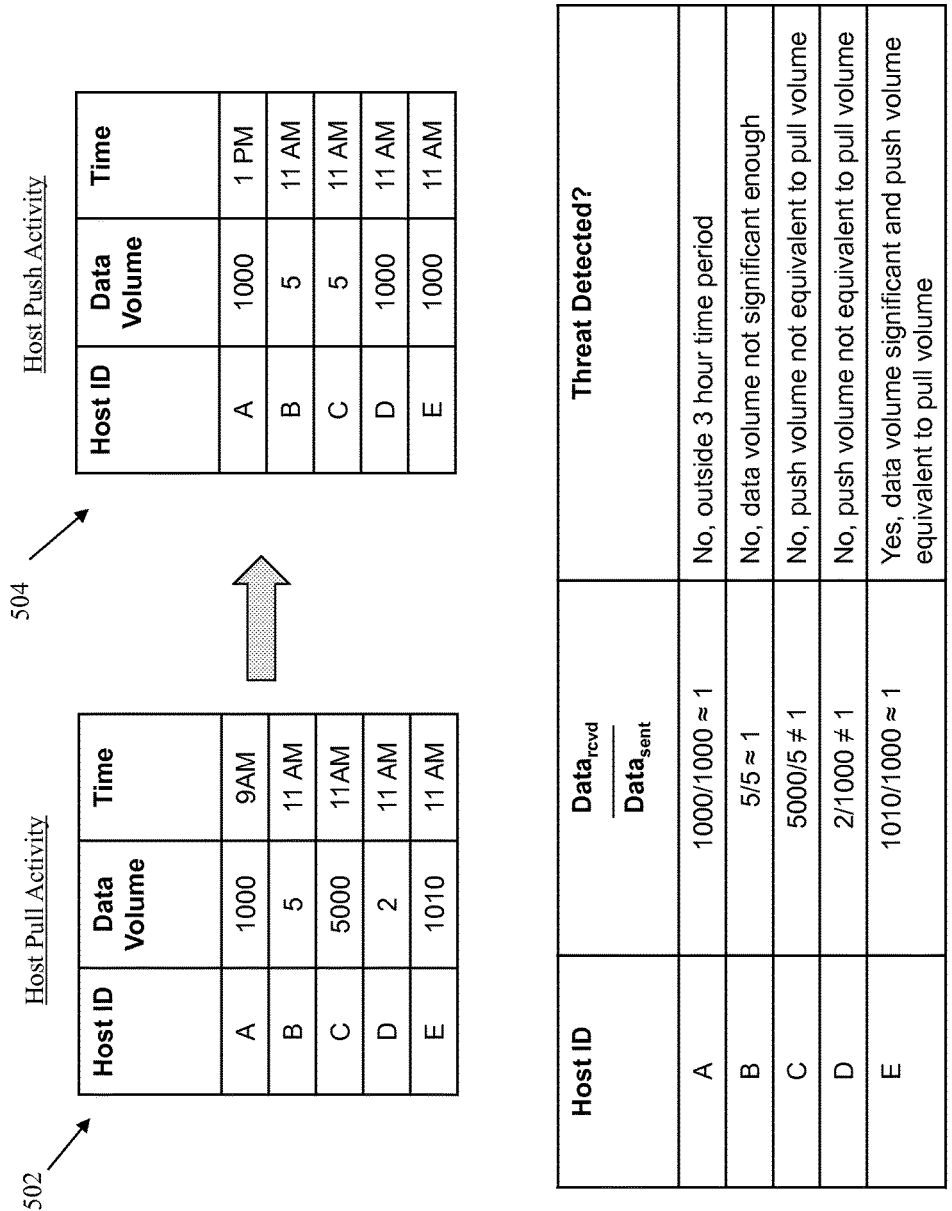
FIG. 5 provides an illustrative example according to some embodiments of the invention.

FIG. 5 provides an illustrative example according to some embodiments of the invention. Chart 502 shows some example metadata of pull activity that may be captured for internal hosts. This chart tracks the data communications between each of the identified hosts and other internal hosts within the company network. Chart 502 identifies for each host the data volume pulled from another internal host, as well as an indication of a point in time at which the data is pulled.

Here, Host A is shown as retrieving a data volume of 1000 (e.g., 1000 Mbytes) at a point in time identified as "9 AM" (e.g., a half hour time period starting at 9 AM). Similarly, Host B is shown as retrieving a data volume of 5 at a point in time identified as "11 AM", Host C is shown as retrieving a data volume of 5000 at a point in time identified as "11 AM", Host D is shown as retrieving a data volume of 2 at a point in time identified as "11 AM", and Host E is shown as retrieving a data volume of 1010 at a point in time identified as "11 AM".

Chart 504 shows some example metadata that may be captured of push activity for the internal hosts. This chart tracks the data communications between each of the identified hosts and external hosts that are located outside the company network. Chart 504 identifies for each host the data volume pushed from that host to an external network location, as well as an indication of a point in time when the data that is pushed. Here, Host A is shown as sending a data volume of 1000 (e.g., 1000 Mbytes) at a point in time identified as "1 PM". Similarly, Host B is shown as sending a data volume of 5 at a point in time identified as "11 AM", Host C is shown as sending a data volume of 5 at a point in time identified as "11 AM", Host D is shown as sending a data volume of 1000 at a point in time identified as "11 AM", and Host E is shown as sending a data volume of 1000 at a point in time identified as "11 AM".

It is noted that these data quantities may be comprised of aggregated amounts identified for the hosts over a given period of time, e.g., over a three-hour time period, with the point in time indicating the start, middle or end of the time period.

Next, a determination is made whether any of the host behavior is identifiable as being indicative of a threat. For example, abnormal data pulls and pushes initiated by the same host that happen in a given time window can be correlated to identify threats. Significant data transfers (pulls or pushes) by a given host that are found to be significantly different from the baseline behavior of the hosts are also flagged as anomalous. This could be triggered by an abnormal volume in the data transfer from or to a resource previously contacted by the host or a significant data transfer from or to a resource not previously accessed.

To illustrate and explain this embodiment of the invention, an assumption can be made that anomalous behavior occurs if: (a) a sufficient threshold volume of data is exchanged by the data transfers (e.g., greater than 100); (b) the data pull/push ratio is approximately 1; and (c) the abnormal behavior is considered a threat if the data pull and push are performed over a relatively short time period, e.g., over a three hour time period. With these assumptions in mind, each host's behavior is analyzed.

First, the behavior for Host A is analyzed. Here, it can be seen in chart 502 that Host A has received a data quantity of 1000 from other internal hosts. From chart 504, it can be seen that Host A has sent a data quantity of 1000 to external hosts. In this situation, the volume of the exchanged data (1000 in and 1000 out) appears to meet the required threshold (e.g., a threshold of 100). In addition, the pull/push ratio appears to be approximately equal to 1 (1000/1000 equals 1). However, this situation is not identified as a threat since the pull/push behavior is outside of the established time period of 3 hours (the pull behavior was performed at 9 AM and the push behavior at 1 PM—which is beyond a three-hour time period).

The behavior for Host B is then analyzed. It can be seen in chart 502 that Host B has received a data quantity of 5 from other internal hosts. From chart 504, it can be seen that Host B has sent a data quantity of 5 to external hosts. In this situation, the volume of the exchanged data (5 in and 5 out) does not appear to meet the required threshold (e.g., a threshold of 100). Therefore, this situation is not identified as a threat since there is insufficient data volume involved in the data exchange to make the indication of malicious behavior. This is despite the fact that the pull/push ratio appears to be approximately equal to 1 (i.e., 5/5) and the data exchanges have occurred within the three-hour time period.

The behavior for Host C is analyzed next. It can be seen in chart 502 that Host C has received a data quantity of 5000 from other internal hosts. From chart 504, it can be seen that Host C has sent a data quantity of 5 to external hosts. In this situation, the volume of the pulled data (5000 in) appears to meet the required threshold (e.g., a threshold of 100), while the volume of data uploaded (5 out) does not meet the threshold. Despite the time period requirement for the data exchanges appears to be met since they occurred within the three-hour time window, this situation is not identified as a threat.

The behavior for Host D then analyzed. It can be seen in chart 502 that Host D has received a data quantity of 2 from other internal hosts. From chart 504, it can be seen that Host D has sent a data quantity of 1000 to external hosts. In this situation, the volume of the data uploaded (1000 out) appears to meet the required threshold (e.g., a threshold of 100) while the volume of data pulled (2 in) does not meet the threshold. Despite the time period requirement for the data exchanges being met since they occurred within the three-hour time window, this situation is not identified as a threat.

Finally, the behavior for Host E is analyzed. It can be seen in chart 502 that Host E has received a data quantity of 1010 from other internal hosts. From chart 504, it can be seen that Host E has sent a data quantity of 1000 to external hosts. In this situation, the volume of the exchanged data (1010 in and 1000 out) appears to meet the required threshold (e.g., a threshold of 100). In addition, the time period requirement for the data exchanges appears to be met since they occurred within the three-hour time window. In this situation, the pull/push ratio appears to be approximately equal to 1 (1010/1000). Therefore, this situation meets all of the required criteria, and hence is identifiable as abnormal behavior that is indicative of an insider threat.

The general idea is that a possible threat may be identifiable if the volume of the pulled data is roughly comparable to the volume of the pushed data within a reasonable time period. Therefore, some embodiments operate by determining whether the pull/push ratio is equivalent to 1 within a relatively short time period. However, many variants of this approach can be taken within the scope of the invention. For example, a range of acceptable pull/push ratios may be established to implement identification of a threat, e.g., where ratios that are within the range 0.8 to 1.2 may be considered as a threat. In addition, any suitable time period windows may be established for operation of the invention. While some the above example is illustrated using a time period window of 3 hours, it is noted that other time period windows may also be employed, such as time periods of several hours, one day, multiple days, one week, multiple weeks, or one month. Different time windows in which the data transfers are performed can also be considered, so that large data transfers occurring in small time windows as well as small data transfers recurring with large frequency (summing up to large volumes) would be both captured by the algorithm. Also, correlations between data types in pull and push transfers can be included.

In addition, the volume of the exchanged data can be used as a filter to remove insignificant data transfers from consideration, where the threshold data volume is adjustable depending upon the specific needs of the organization. In some cases, different types of data may correspond to different thresholds used to identify possibly malicious data volumes. These threshold(s) for data volumes are used to limit the threat detection to process only meaningful data exchanges, and to remove from consideration any data exchanges having data transfer volumes that are too small.

Data weighting may be applied to the data that is analyzed. Data exchanges that involve more "sensitive" assets/servers can be weighted to provide more significance and amplifications to the calculations as compared to data exchanges involving less sensitive hosts. Examples of assets that may be deemed to be relatively more sensitive may include finance servers having confidential financial data, code servers, legal servers, etc. (as compared to less sensitive servers such as print servers). These assets may receive weightings that may be applied to any of the above calculations. For example, if filtering is applied based upon threshold data volumes, then weightings can be applied such that data volumes pulled from sensitive assets receives a multiplier value that increases the effective data volumes. As another example, if the threat detection approach checks for a pull/push ratio to fall within a certain acceptable range, then that range may be broadened when analyzing hosts which pulled data from more sensitive servers. Also, restrictions in network protocols and transferred data types with regard to specific sensitive servers are possible.

It is noted that the weightings can be applied to any data characteristic or attribute of interest, particularly as they relate to known threat behaviors. For example, one known threat scenario involves the attempted exfiltration of data at odd hours of the day or on weekends, on the theory that performing malicious activities during the business day is more likely to be detected. Therefore, data exchanges that occur in the middle of the night or on weekends may receive additional weightings to emphasize the possible importance of these conditions to the threat detection.

In some embodiments, instead of looking for data transfers above predetermined thresholds, a baseline behavior for internal hosts is built by monitoring the normal data exchange pattern between any internal hosts and internal resources in the company network, as well as common data uploads to external hosts. Abnormal data transfers (in terms of volume or due to particular asset involved) that are potential insider threat are then detected as outliers with respect to the normal baseline behavior for a given internal host.

In some embodiments, the above approach to perform threat detections can be performed in near real time. This approach is taken to look for behavior which can be recognized by looking at multiple sessions over some span of time. The algorithms process sessions and individually decide whether to ignore them (if they are not of interest), to accumulate state about them (if they are of interest, but the threshold set for this type of detection hasn't been reached) or to signal a detection (if the collected state has crossed the threshold).

The near-real-time detection approach perform stateful processing in the sense that they encounter multiple sessions attributed to a specific host in a certain window of time in order to decide whether the collection of sessions is signaling malicious behavior or not.

The near-real-time processing algorithm processes a session at a time and makes its own decision on whether to ignore the session (because it includes nothing of interest), whether to add to state which it is accumulating for a particular internal host, and/or to report a preliminary detection related to an accumulated set of sessions (which look like they may signal malicious intent) for that host. Each near-real-time processing algorithm accumulates short-term state as it is looking to detect sustained behavior of a particular kind by a particular host.

Therefore, what has been described is an inventive method and system for identifying insider threats within an organization by identifying abnormal data transfers. Such capability provides significant aid for the information security professionals in the identification of malicious users that could steal intellectual property or any kind of sensitive data.

The approach proposed above provides multiple benefits for the identification of insider threats leading to data exfiltration. It only requires sensors on the level of the network—no invasive host-based software sensors are required. It identifies correlated pulling and pushing of similar amount of data that could represent exfiltration of sensitive information. It easily defines baseline behavior for all hosts based on a limited set of metadata. It identifies in near real-time an abnormal data exchange pattern as deviation from the baseline. It can automatically adjust and adapt to each network it encounters.

It is noted that the inventive concepts disclosed herein are not limited in their application only to the insider threat scenario. The invention is applicable to any scenario involving a possible threat from a host on an internal network, even if the controlling source of the threat is not an "insider". For example, consider the situation where a machine on an internal network is behaving outside the baseline of its normal behavior, but is doing so at the behest of an outside attacker who has taken over the machine by installing some malware. The above-described detection mechanisms can be used to detect this type of threat, even if it involves an "outsider" rather than an "insider" that operates the host in a malicious manner.

System Architecture Overview

Figure 6:
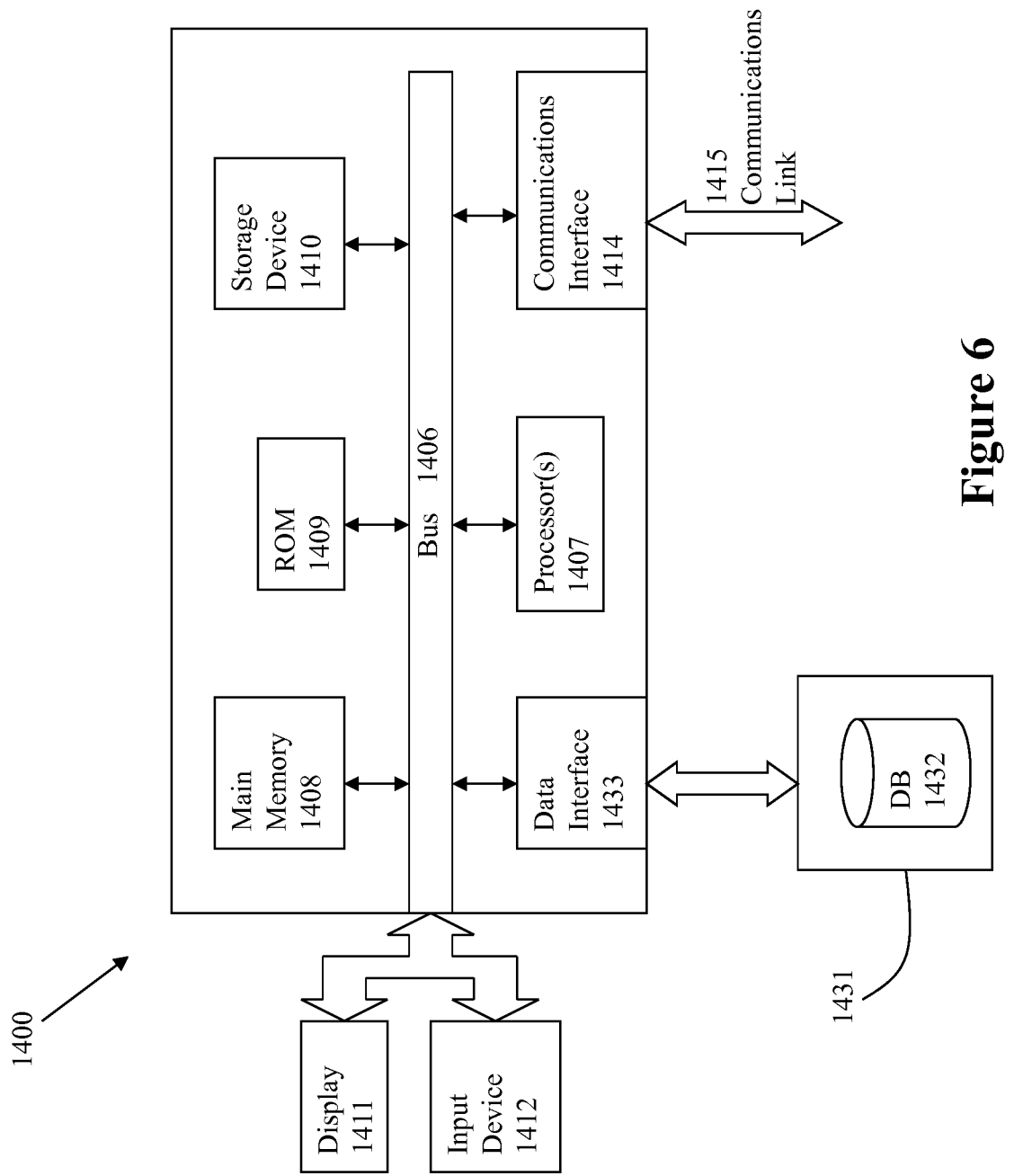
FIG. 6 depicts a computerized system on which an embodiment of the invention can be implemented.

FIG. 6 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for performing threat detection in a network comprising:
    monitoring communications traffic in the network;
    identifying a data exchange pattern, the data exchange pattern comprising a pull of data corresponding to data transferred to an internal host from an internal network location and a push of data corresponding to data delivered from the internal host to an external host;
    determining whether the data exchange pattern is indicative of an insider threat by calculating a ratio of the pull of data relative to the push of data; and
    reporting a threat if abnormal behavior is identified, wherein the abnormal behavior corresponds to the ratio having a value of approximately 1.

2. The method of claim 1, further comprising modifying a learned baseline behavior for the internal host based at least on the abnormal behavior.

3. The method of claim 2, wherein the learned baseline behavior for the internal host is built by monitoring a normal data exchange pattern between any internal hosts and internal resources in the network.

4. The method of claim 1, wherein the value of approximately 1 correlates to a range of 0.8 to 1.2.

5. The method of claim 1, wherein a data volume threshold is used to filter insignificant data exchanges.

6. The method of claim 1, wherein metadata is extracted from the communications traffic, the metadata comprising at least one of data volume, data exchange frequency, data exchange attempts, data exchange rates, data exchange time periods, or any combination thereof.

7. The method of claim 1, wherein weightings are applied to analyze the data exchange pattern.

8. The method of claim 7, wherein the weightings are applied to important or sensitive assets or to certain absolute time periods such as time of day.

9. The method of claim 1, wherein the data exchange pattern is analyzed over a given time period.

10. The method of claim 1, where detected threats are stored in a threat database.

11. The method of claim 1, wherein the threat detection encounters multiple sessions attributed to the internal host in a certain time window to determine whether a collection of sessions is indicative of malicious behavior.

12. A computer program product embodied on a non-transitory computer readable medium, the computer readable medium having stored thereon a sequence of instructions which, when executed by a processor causes the processor to execute a method for performing a process to detect threats in a network, the process comprising:
monitoring communications traffic in the network;
identifying a data exchange pattern the data exchange pattern comprising a pull of data corresponding to data transferred to an internal host from an internal network location and a push of data corresponding to data delivered from the internal host to an external host;
determining whether the data exchange pattern is indicative of an insider threat by calculating a ratio of the pull of data relative to the push of data; and
reporting a threat if abnormal behavior is identified, wherein the abnormal behavior corresponds to the ratio having a value of approximately 1.

13. The computer program product of claim 12, further comprising modifying a learned baseline behavior for the internal host based at least on the abnormal behavior.

14. The computer program product of claim 13, wherein the learned baseline behavior for the internal host is built by monitoring a normal data exchange pattern between any internal hosts and internal resources in the network.

15. The computer program product of claim 12, wherein the value of approximately 1 correlates to a range of 0.8 to 1.2.

16. The computer program product of claim 12, wherein a data volume threshold is used to filter insignificant data exchanges.

17. The computer program product of claim 12, wherein metadata is extracted from the communications traffic, the metadata comprising at least one of data volume, data exchange frequency, data exchange attempts, data exchange rates, data exchange time periods, or any combination thereof.

18. The computer program product of claim 12, wherein weightings are applied to analyze the data exchange pattern.

19. The computer program product of claim 18, wherein the weightings are applied to important or sensitive assets or to certain absolute time periods such as time of day.

20. The computer program product of claim 12, wherein the data exchange pattern is analyzed over a given time period.

21. The computer program product of claim 12, where detected threats are stored in a threat database.

22. The computer program product of claim 12, wherein the threat detection encounters multiple sessions attributed to the internal host in a certain time window to determine whether a collection of sessions is indicative of malicious behavior.

23. A system, comprising:
a computer processor to execute a set of program code instructions;
a memory to hold the set of program code instructions, in which the set of program code instructions comprises program code to perform:
monitoring communications traffic in a network;
identifying a data exchange pattern, the data exchange pattern comprising a pull of data corresponding to data transferred to an internal host from an internal network location and a push of data corresponding to data delivered from the internal host to an external host;
determining whether the data exchange pattern is indicative of an insider threat by calculating a ratio of the pull of data relative to the push of data; and
reporting a threat if abnormal behavior is identified, wherein the abnormal behavior corresponds to the ratio having a value of approximately 1.

24. The system of claim 23, further comprising modifying a learned baseline behavior for the internal host based at least on the abnormal behavior.

25. The system of claim 24, wherein the learned baseline behavior for the internal host is built by monitoring a normal data exchange pattern between any internal hosts and internal resources in the network.

26. The system of claim 23, wherein the value of approximately 1 correlates to a range of 0.8 to 1.2.

27. The system of claim 23, wherein a data volume threshold is used to filter insignificant data exchanges.

28. The system of claim 23, wherein metadata is extracted from the communications traffic, the metadata comprising at least one of data volume, data exchange attempts, data exchange frequency, data exchange rates, data exchange time periods, or any combination thereof.

29. The system of claim 23, wherein weightings are applied to analyze the data exchange pattern.

30. The system of claim 29, wherein the weightings are applied to important or sensitive assets or to certain absolute time periods such as time of day.

31. The system of claim 23, wherein the data exchange pattern is analyzed over a given time period.

32. The system of claim 23, where detected threats are stored in a threat database.

33. The system of claim 23, wherein the threat detection encounters multiple sessions attributed to the internal host in a certain time window to determine whether a collection of sessions is indicative of malicious behavior.

* * * * *